United States Patent
Choi et al.

(10) Patent No.: US 7,889,299 B2
(45) Date of Patent: Feb. 15, 2011

(54) LIQUID CRYSTAL DISPLAY DEVICE AND METHOD OF FABRICATING THE SAME

(75) Inventors: Sang-Ho Choi, Gunpo-si (KR); Su-Seok Choi, Seongnam-si (KR); Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 885 days.

(21) Appl. No.: 11/298,619

(22) Filed: Dec. 12, 2005

(65) Prior Publication Data

US 2006/0146240 A1     Jul. 6, 2006

(30) Foreign Application Priority Data

Dec. 30, 2004   (KR)   ............... 10-2004-0116720

(51) Int. Cl.
  *G02F 1/1337*   (2006.01)
(52) U.S. Cl. ........................ 349/127
(58) Field of Classification Search ............. 349/127
  See application file for complete search history.

(56) References Cited

U.S. PATENT DOCUMENTS 6,417,907 B2    7/2002   Choi et al.
6,549,255 B2 *  4/2003   Stebler et al. ............... 349/127

FOREIGN PATENT DOCUMENTS

| JP | 2000-221496 | 8/2000 |
|---|---|---|
| JP | 2002-520652 | 7/2002 |
| JP | 3-189627 | 7/2003 |
| JP | 6-265909 | 10/2006 |

* cited by examiner

*Primary Examiner*—James A Dudek
(74) *Attorney, Agent, or Firm*—McKenna, Long & Aldridge LLP

(57) ABSTRACT

A liquid crystal display device includes: a first substrate and a second substrate facing each other; a pixel electrode on an inner surface of the first substrate; a first alignment layer of a ferroelectric liquid crystal material over the pixel electrode, the first alignment layer having a first spontaneous polarization along a first direction; a common electrode on an inner surface of the second substrate; a second alignment layer of the ferroelectric liquid crystal material over the common electrode, the second alignment layer having a second spontaneous polarization along the first direction; a liquid crystal layer in between the first alignment layer and the second alignment layer, the liquid crystal layer including a nematic liquid crystal material and a dye material; and a first polarizer disposed on an outer surface of one of the first substrate and the second substrate.

15 Claims, 4 Drawing Sheets

LIQUID CRYSTAL DISPLAY DEVICE AND METHOD OF FABRICATING THE SAME

The present invention claims the benefit of Korean Patent Application No. 2004-0116720, filed in Korea on Dec. 30, 2004, which is hereby incorporated by reference for all purposes as if fully set forth herein.

BACKGROUND OF THE INVENTION

1. Field of the Invention

The present invention relates to a display device, and more particularly, a liquid crystal display (LCD) device and a method of fabricating a liquid crystal display device.

2. Discussion of the Related Art

As the information age progresses, light weight, thin flat panel display (FPD) devices having low power consumption characteristics are being developed, and liquid crystal display (LCD) devices may be categorized as non-emissive display devices that are commonly used in notebook and desktop computers because of their high resolution, capability of displaying colored images, and high quality image display.

The LCD panel includes two substrates facing and spaced apart from each other, and a liquid crystal material in between. Liquid crystal molecules of the liquid crystal material have a dielectric constant and refractive index anisotropic characteristics due to their long, thin shape. In addition, two electric field generating electrodes are formed on each of the two substrates. Accordingly, an orientation alignment of the liquid crystal molecules may be controlled by supplying a voltage to the two electrodes, wherein transmittance of the LCD panel is changed according to polarization properties of the liquid crystal material.

FIG. 1 is a schematic perspective view of an LCD device according to the related art.

In FIG. 1, an LCD device 1 includes an upper substrate 10, a lower substrate 20 facing the upper substrate 10, and a liquid crystal layer 40 in between the upper and lower substrates 10 and 20. A color filter layer 14 is formed on the upper substrate 10, a black matrix 12 is formed on the color filter layer 14, and a common electrode 18 on the black matrix 12 and the color filter layer 14.

A gate line 22 and a data line 24 crossing the gate line 22 define a pixel region P and are formed on the lower substrate 20; a thin film transistor T is disposed near a crossing of the gate and data lines 22 and 24; and a pixel electrode 36 is connected to the thin film transistor T in the pixel region P.

The LCD device 1 may be referred as a LCD panel, and although not shown the LCD device 1 may further include upper and lower polarizers on outer surfaces of the upper and the lower substrates 10 and 20, respectively, a backlight unit under the lower substrate 20, and a top case and a bottom case supporting the LCD device 1.

FIG. 2 is a schematic cross-sectional view of an LCD device including upper and lower polarizers according to the related art.

In FIG. 2, an upper substrate 11 and a lower substrate 21 face each other, a common electrode 18 is formed on an inner surface of the upper substrate 11, and a pixel electrode 36 is formed on an inner surface of the lower substrate 21, and an upper polarizer 52 is disposed on an outer surface of the upper substrate 11 and a lower polarizer 50 is disposed on an outer surface of the lower substrate 21.

A liquid crystal layer 40 is in between the common electrode 18 and the pixel electrode 36.

Although not shown, an upper alignment layer is formed between the common electrode 18 and the liquid crystal layer 40, and a lower alignment layer is formed between the pixel electrode 36 and the liquid crystal layer 40. In other words, the liquid crystal layer contacts the upper and the lower alignment layers.

A desired gray level in the LCD device 60 may be obtained by controlling a transmittance due to birefringence of liquid crystal molecules of the liquid crystal layer 40. The birefringence is varies according to a vertical electric field between the common electrode 18. and the pixel electrode 36 when the electric field is applied to the liquid crystal layer 40.

However, to obtain the desired gray level, cell efficiency is not perfect because the birefringence decreases as viewing angle increases.

Furthermore, the LCD device 60 includes two polarizers, the upper and the lower polarizers 52 and 50, wherein the backlight unit light (not shown) may be shielded or reflected by the lower polarizer 50 closer to a backlight unit (not shown) than the upper polarizer 52.

Additionally, light leakage occurs due to surface reflections on the lower polarizer 50. Generally, the thickness of the polarizer is about 200 micrometers, and this feature is contrary to achieving a thin display.

In addition, the more the thickness of the polarizer is increased, the flexibility of the LCD device 60 is reduced due to the hardness of the polarizer.

Also, in order to compensate for the retardation ratio between a transmissive portion and a reflective portion in a reflective LCD device, a compensation plate should be added.

However, it is difficult to obtain a desired light transmission efficiency and a light and thin LCD device due to the addition of the compensation plate.

SUMMARY OF THE INVENTION

Accordingly, the present invention is directed to a liquid crystal display device and a method of fabricating a liquid crystal display device that substantially obviates one or more of the problems due to limitations and disadvantages of the related art.

An advantage of the present invention is to provide a liquid crystal display device and a method of fabricating a liquid crystal display device that is light weight and thin.

Another advantage of the present invention is to provide a liquid crystal display device and a method of fabricating a liquid crystal display device that may reduce manufacturing cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a first substrate and a second substrate facing each other; a pixel electrode on an inner surface of the first substrate; a first alignment layer of a ferroelectric liquid crystal material over the pixel electrode, the first alignment layer having a first spontaneous polarization along a first direction; a common electrode on an inner surface of the second substrate; a second alignment layer of the ferroelectric liquid crystal material over the common electrode, the second alignment layer having a second spontaneous polarization along the first direction; a liquid crystal layer in between the first alignment layer and the second alignment layer, the liquid crystal layer including a nematic liquid crystal material and a dye material; and a first polarizer disposed on an outer surface of one of the first substrate and the second substrate.

In another aspect, a method of fabricating a liquid crystal display device includes: forming a pixel electrode on a first substrate; forming a first alignment layer of a ferroelectric liquid crystal material on the pixel electrode, the first alignment layer having a first spontaneous polarization along a first direction; forming a common electrode on a second substrate; forming a second alignment layer of the ferroelectric liquid crystal material on the common electrode, the second alignment layer having a second spontaneous polarization along the first direction; attaching the first substrate and the second substrate such that the first alignment layer and the second alignment layer face each other; forming a liquid crystal layer in between the first alignment layer and the second alignment layer, the liquid crystal layer including a nematic liquid crystal material and a dye material; and forming a polarizer on a surface of one of the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

It is noted that a ferroelectric liquid crystal material is utilized for first and second alignment layers of a liquid crystal display device and a liquid crystal layer that includes a nematic liquid crystal material and a dye material is in between the first and second alignment layers.

The alignment layers of the ferroelectric liquid crystal material include a permanent dipole moment that controls the liquid crystal layer including the dye material. The permanent dipole moment may be arranged along one direction without an external electric field under a predetermined condition. When one edge of a liquid crystal director is fixed, the other edge of the liquid crystal director moves in a direction such as in a circular direction.

Figure 1:
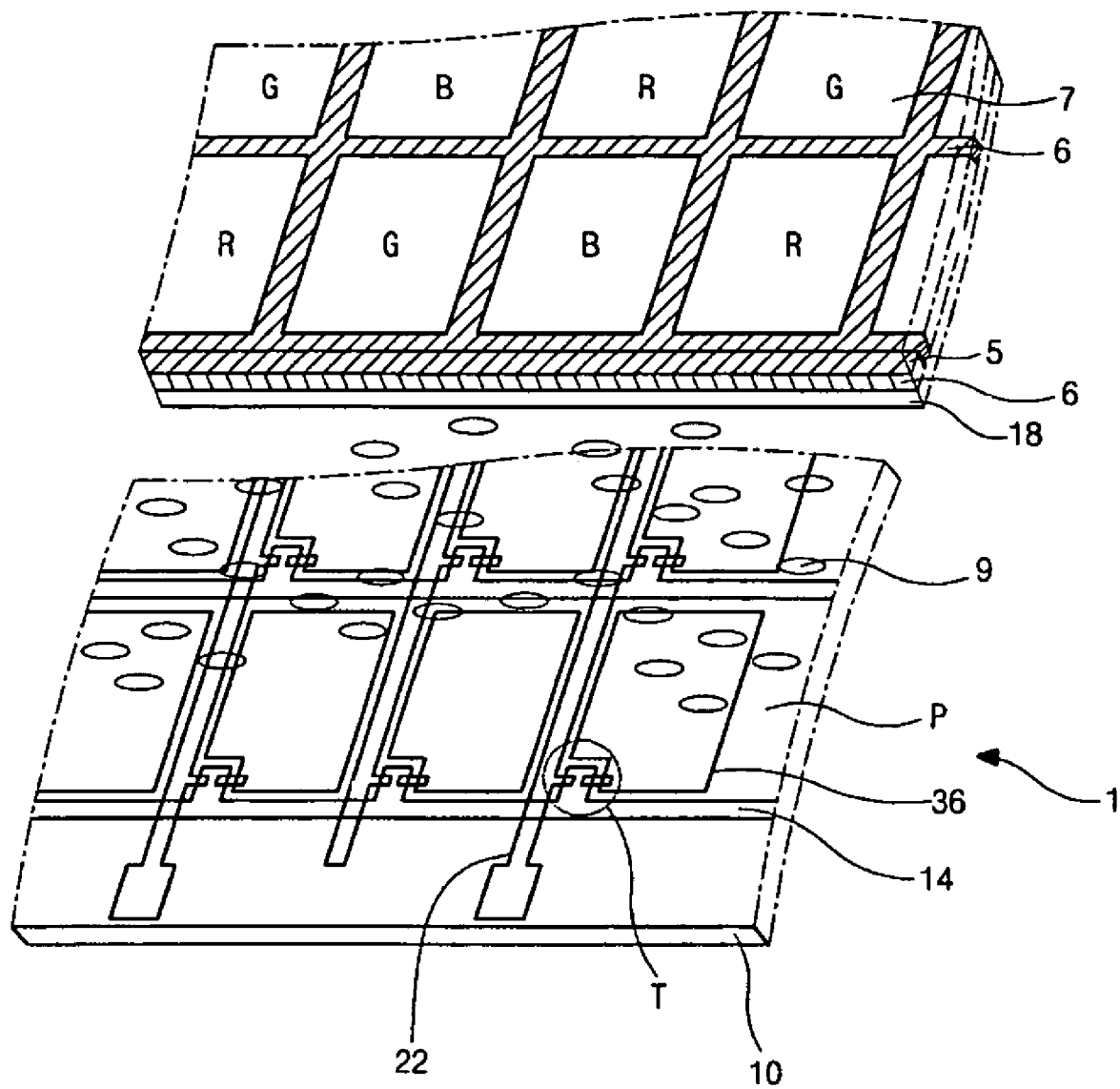
FIG. 1. is a schematic perspective view of an LCD. device according to the related art.
Figure 2:
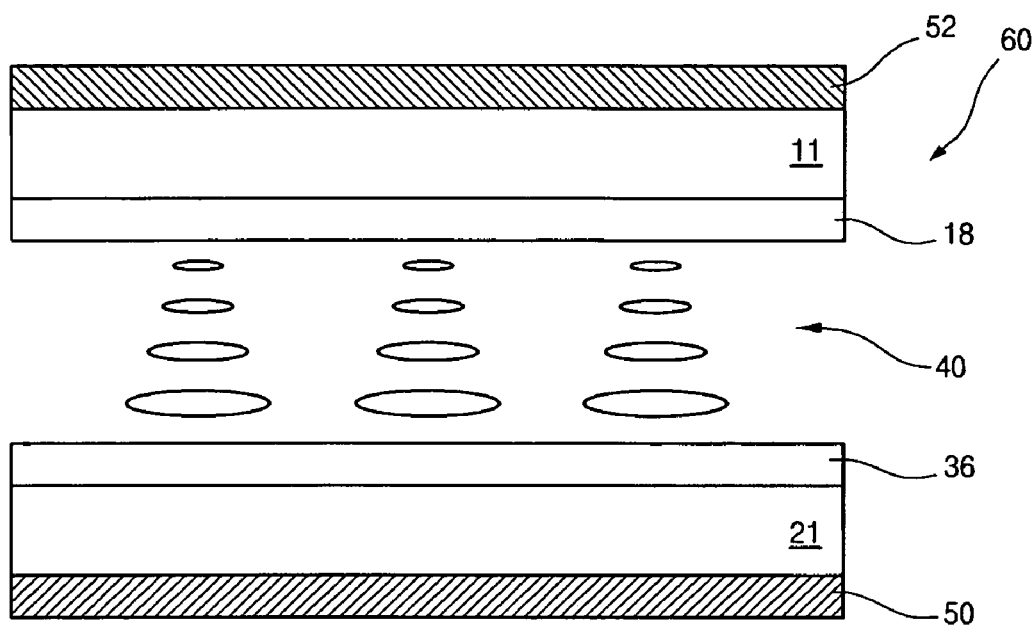
FIG. 2 is a schematic cross-sectional view of an LCD panel including upper and lower polarizers according to the related art.
Figure 3:
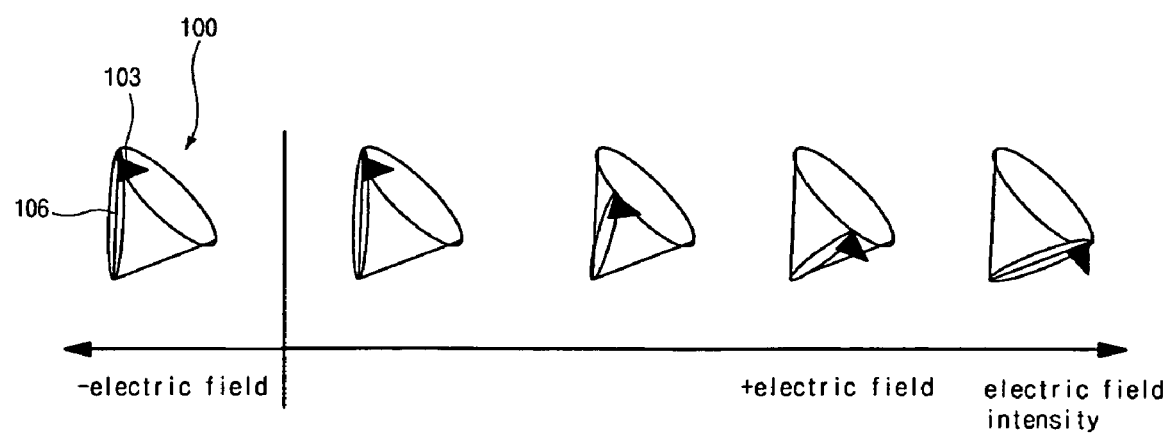
FIG. 3 is a schematic view illustrating a movement of a ferroelectric liquid crystal director by an applied electric field according to the present invention.

FIG. 3 is a view illustrating the movement of a ferroelectric liquid crystal director due to an applied electric field according to the present invention.

In FIG. 3, one edge of the liquid crystal director 106 with respect to the alignment layer is fixed at the vertex of cone 100 and the motion trajectory the liquid crystal director 106 is illustrated and the other edge has a rotation formation along one direction in the spiral circumference. Here, when an electric filed is applied to the liquid crystal layer material (not shown), the rotation direction of the liquid crystal director 106 corresponds to a direction of a spontaneous polarization 103 generated by the liquid crystal director 106.

Below, the ferroelectric liquid crystal is explained in detail.

Generally, the liquid crystal material has a phase-transition varying with temperature, and specifically, the ferroelectric liquid crystal material sequentially transitions from isotropy to a nematic phase then to a smectic phase to finally a crystal phase. The viscosity of the ferroelectric liquid crystal material changes in accordance with temperature, and when the ferroelectric liquid crystal material is in a viscosity phase, its viscosity is very low. When the ferroelectric liquid crystal material is in a crystal phase, it is at its highest viscosity.

Accordingly, to form the ferroelectric liquid crystal material on the substrate, it should be heated using a high temperature and should be formed in the isotropy phase having a low viscosity. The smectic phase is usually utilized under a normal temperature after forming a liquid crystal panel. The spontaneous polarization is generated when the nematic phase is changed into the smectic phase. The spontaneous polarization may have a role so that the liquid crystal director can be moved along one direction in an ON state. Once the ferroelectric liquid crystal material has the spontaneous polarization, the direction property is continuously maintained.

Accordingly, when the ferroelectric liquid crystal material is utilized for the first and second alignment layers of the LCD device, the liquid crystal layer between the first and second alignment layers may be dynamically rotated. Therefore, the response time of the liquid crystal layer is faster than that of the related art.

Figure 4:
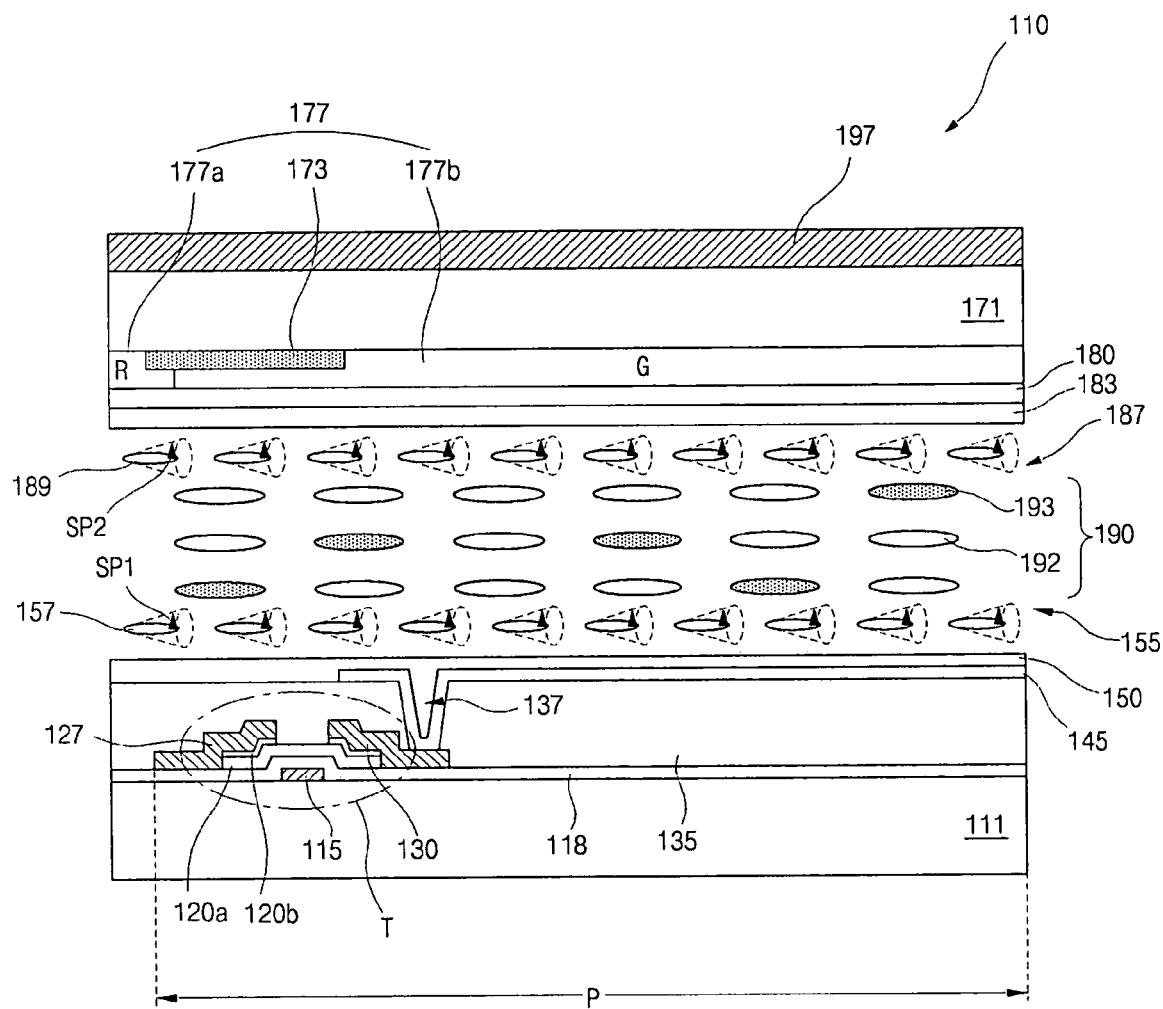
FIG. 4 is a schematic cross-sectional view of a transmissive LCD device according to a first embodiment of the present invention.

FIG. 4 is a schematic cross-sectional view of a transmissive LCD device according to a first embodiment of the present invention.

In FIG. 4, a gate electrode 115 is formed on a first substrate 111, a gate insulating layer 118 is formed on the gate electrode 115, an active layer 120a is formed on the gate insulating layer 118, an ohmic contact layer 120b is formed on the active layer 120a, and a source electrode 127 and a drain electrode 130 spaced apart from the source electrode 127 are formed on the ohmic contact layer 120b. More specifically, the ohmic contact layer 120b, the source electrode 127, and the drain electrode 130 have a channel region CH that exposes a portion of the active layer 120a. The gate electrode 115, the active layer 120a, the ohmic contact layer 120b, the source electrode 127, and the drain electrode 130 constitute a thin film transistor T. The active layer 120a and the ohmic contact layer 120b constitute a semiconductor layer 120.

Although not shown, a gate line connected to the gate electrode 115. is formed on the first substrate 111 and a data line connected to the source electrode 127 and crossing the gate line is formed to define a pixel region P.

A passivation layer 135 is formed on the thin film transistor T and has a drain contact hole 137 that exposes a portion of the drain electrode 130, and a pixel electrode 145 is formed on the passivation layer 135 and is connected to the drain electrode 130 via the drain contact hole 137 in the pixel region P. A first alignment layer 155 is formed on the pixel electrode 145, wherein the first alignment layer 155 includes a ferroelectric liquid crystal material. For example, the first alignment layer 155 has a thickness from about 1000Å to about 3000Å. It is noted that the first alignment layer 155 has a first liquid crystal director 157 including a first spontaneous polarization SPI has a rotating direction with respect to a second substrate 171.

Furthermore, a first auxiliary alignment layer 150 is formed between the pixel electrode 145 and the first alignment layer 155. For example, the first auxiliary alignment layer 150 may be made of polyimide.

The ferroelectric liquid crystal material has a smectic phase.

Next, a color filter layer 177 is formed on the second substrate 171, a black matrix 173 is formed on the color filter layer 177, and a common electrode 180 is formed on the color filter layer 177 and the black matrix 173. A second alignment layer 187 is formed on the common electrode 180, wherein the second alignment layer 187 is a ferroelectric liquid crystal material. For example, the second alignment layer 187 has a thickness from about 1000 Å to about 3000 Å. At this time, the second alignment layer 187 has a second liquid crystal director 189 having a second spontaneous polarization SP2 that has a rotation direction with respect to the second substrate 171.

In other words, the rotation direction of the second alignment layer 187 has the same direction as the rotation of the first alignment layer 155. Alternatively, the rotation directions of the first and the second alignment layers 155 and 187 may be toward the first substrate 111.

Furthermore, a second auxiliary alignment layer 183 is formed between the common electrode 180 and the second alignment layer 187. For example, the second auxiliary alignment layer 183 may be polyimide. The second auxiliary alignment layer 183 acts as an alignment layer for the second alignment layer 187 not for the liquid crystal layer.

In addition, the rotation angle of the first and second liquid crystal director 157 and 189 that is fixed at an edge of the first and the second alignment layers 155 and 187 has a range from about 0 degree to about 90 degrees.

A liquid crystal layer 190 is formed between the first and the second alignment layers 155 and 187, wherein the liquid crystal layer 190 includes a nematic liquid crystal material and a dye material in substantially equal amounts. It is noted that the liquid crystal layer 190 can be dynamically moved by rotating along one direction in proportion with a size of an electric field applied to the first and second liquid crystal directors 157 and 189 by the electric field of the liquid crystal layer 190.

A primary orientation of the liquid crystal layer 190 may be parallel to or perpendicular to a transmissive axis of the polarizer 197. For example, when the primary orientation of the liquid crystal layer 190 is parallel to the transmissive axis of the polarizer 197, the LCD device 110 is driven as a normally white mode. Conversely, when the primary orientation of the liquid crystal layer 190 is perpendicular to the transmissive axis of the polarizer 197, the LCD device 110 is driven as a normally black mode.

When a vertical electric field is applied by the pixel electrode 145 and the common electrode 180, the first and the second liquid crystal directors 157 and 189 in the first and the second alignment layers 155 and 187 are rotated. Accordingly, the nematic liquid crystal molecules 192 are dynamically rotated right and left by the rotation of the first and the second liquid crystal directors 157 and 189, and finally, the liquid crystal layer 190 is movable such as when an in plane switching electric field is applied to the LCD device 110, thereby improving the brightness without a reduction of the aperture ratio different from an in plane switching mode of the related art.

It is noted that the dye molecules 193 of the dye material is simultaneously moved with the nematic liquid crystal molecules 192. Specifically, the dye molecules 193. are moved along the rotation directions of the first and the second directors 157 and 189 and has an effect such that one optical axis is rotated. Therefore, the transmission of light can be controlled by this effect, thereby controlling a gray level.

At this time, the dye material has a characteristic such that absorption ratio of light is changed by a polarization direction, and red, green and blue dye materials can absorb light to produce black.

The primary orientation of the liquid crystal layer 190 is arranged to be parallel to or vertical to the transmissive axis of the polarizer 197, and the first and the second alignment layers 155 and 187 has a rotation angle of about 90 degrees. Therefore, the nematic liquid crystal molecules and the dye liquid crystal molecules may be rotated a maximum of 90 degrees. Accordingly, the rotation angle with the transmissive axis is changed from a parallel state to a vertical state or from a vertical state to a parallel state, thereby obtaining a desired gray level.

Consequently, the liquid crystal layer 190 functions as another polarizer rotating light by about 90 degrees, thereby reducing the number of polarizers. Therefore, a light and thin LCD device may be obtained using one polarizer and the product cost can be reduced.

The present invention includes a second embodiment regarding a reflective LCD device which has the same first and second alignment layers including the ferroelectric liquid crystal and the same liquid crystal layer including the nematic liquid crystal material and the dye material as the first embodiment regarding the transmissive LCD device. Therefore, the second embodiment will demonstrate a reflective LCD device different from the first embodiment of the transmissive LCD. device.

Figure 5:
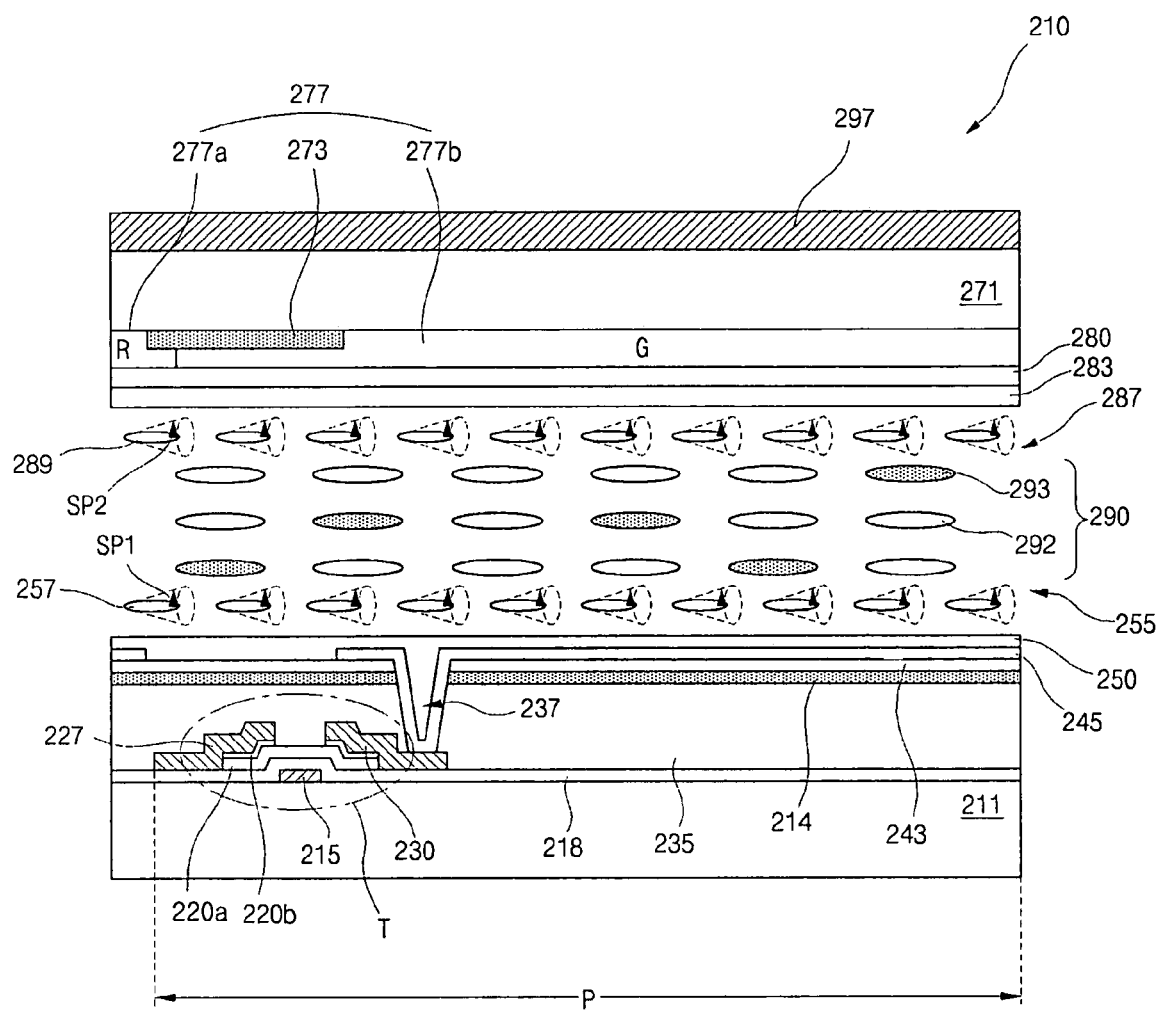
FIG. 5 is a schematic cross-sectional view of a reflective LCD device according to a second embodiment of the present invention.

FIG. 5 is a schematic cross-sectional view of a reflective LCD device according to a second embodiment of the present invention.

In FIG. 5, a first alignment layer 255 is formed on a first substrate 211, a second alignment layer 287 is formed on a second substrate 271, a liquid crystal layer 290 is interposed between the first and the second alignment layers 255 and 287, wherein the first and the second alignment layers 255 and 287 consist of a ferroelectric liquid crystal material having first and second liquid crystal directors 257 and 289 including first and second spontaneous polarizations SP1 and SP2, and the liquid crystal layer 290 includes a nematic liquid crystal material 292 and a dye material 293 having a characteristic absorbing light.

A thin film transistor T including a gate electrode 215, an active layer 220a, an ohmic contact layer 220b, a source electrode 227, and a drain electrode 230, is disposed on the first substrate 211. A first passivation layer 235 is formed on the thin film transistor T and a reflective layer 214 is formed on the first passivation layer 235, and a second passivation layer 243 is formed on the reflective layer 214, wherein the reflective layer 214 includes a high reflective material such as aluminum (Al), and wherein the first passivation layer 235, the reflective layer 214, and the second passivation layer 243. all have a drain contact hole 237 that exposes a portion of the drain electrode 230. A pixel electrode 245 is formed on the second passivation layer 243, and the pixel electrode 245 is connected to the drain electrode 230 via a drain contact hole 237.

The first alignment layer 255 is formed over the pixel electrode 245, and a first auxiliary alignment layer 250 is formed between the pixel electrode 245 and the first alignment layer 255. For example, the first auxiliary alignment layer 250 may be polyimide (PI).

Although not shown, the reflective layer 214 may be formed between the gate electrode 215 and the first substrate 211, in this case, additional insulating layer should be interposed between the gate electrode 215 and the reflective layer 214.

A color filter layer 277 is formed on the second substrate 271, a black matrix 273 is formed on the color filter layer 277, and a common electrode 280 is formed over the black matrix 273 and color filter layer 277. More specifically, the color filter layer 277 includes red, green, and blue color filter layers 277a, 277b and 277c(not shown), wherein the red, green, and blue color filter layers 277a, 277b and 277c are arranged in the pixel regions P.

A second alignment layer 287 is formed over the common electrode 280 and furthermore a second auxiliary alignment layer 287 is formed between the common electrode 280 and the second alignment layer 287. The second alignment layer 287 and the second auxiliary alignment layer 283 are of the same material as the first alignment layer 255 and the first auxiliary alignment layer 250, respectively.

Furthermore, a polarizer 297 is disposed on an outer surface of the second substrate 271. A transmissive axis of the polarizer 297 is perpendicular to or vertical to a primary orientation of the liquid crystal layer 290 having the dye material 293 as well as the nematic liquid crystal material 292.

The rotation angle of the first and the second liquid crystal directors SP1 and SP2 has a range within about 0 to 90 degrees, the first spontaneous polarization SP1 of the first liquid crystal director in the first alignment layer 255 should be rotated along the same direction as the second spontaneous polarization SP2 of the second liquid crystal director 289 in the second alignment layer 287.

Generally, the reflective LCD device according to the related art further includes a compensation plate in order to compensate for retardation value due to birefringence of the liquid crystal layer.

Although not shown, a method of fabricating a liquid crystal display device includes forming a pixel electrode on a first substrate, forming a first alignment layer of the ferroelectric liquid crystal material on the pixel electrode, the first alignment layer having the first spontaneous polarization along a first direction, forming a common electrode on a second substrate, forming a second alignment layer of a ferroelectric liquid crystal material on the common electrode, the second alignment layer having a second spontaneous polarization along the first direction, attaching the first substrate and the second substrate such that the first alignment layer and the second alignment layer face each other, forming a liquid crystal layer interposed between the first alignment layer and the second alignment layer, the liquid crystal layer including a nematic liquid crystal material and a dye material, and forming a polarizer on a surface of one of the first substrate and the second substrate.

The method further includes forming a first auxiliary alignment layer between the first alignment layer and the pixel electrode, and forming a second auxiliary alignment layer between the second alignment layer and the common electrode.

The method further includes forming a reflective layer on the first substrate, wherein the reflective layer is formed on the pixel electrode with an insulating layer therebetween.

The method further includes forming gate and data lines intersecting each other, and forming a switching element connected to the gate line, the data line, and the pixel electrode.

The method further includes forming a color filter layer on the common electrode, wherein forming the first alignment layer includes forming the first alignment layer by coating the ferroelectric liquid crystal material of an isotropic phase on the first substrate, exposing the first alignment layer under a first atmosphere so that the first alignment layer can have the first spontaneous polarization, forming the second alignment layer by coating the ferroelectric liquid crystal material of an isotropic phase on the second substrate, and exposing the second alignment layer to a second atmosphere to generate the second spontaneous polarization.

It is noted that the nematic liquid crystal molecule has a role such that it rotates the dye molecule that does not generate birefringence. Therefore, the first and the second liquid crystal directors are rotated by the electric field, and then the nematic liquid crystal molecules are rotated by the movement of the first and the second liquid crystal directors, and finally the dye molecules are rotated by the movement of the nematic liquid crystal molecules, thereby obtaining a desired gray level. Therefore, by this mechanism, the retardation through the liquid crystal layer does not occur, so the reflective LCD device according to the present invention does not need a compensation plate different from that of the related art.

Consequently, a light and thin reflective LCD device may be obtained by omitting the compensation plate, thereby reducing the manufacturing cost.

The LCD device according to the present invention includes first and second alignment layers including the ferroelectric liquid crystal material having a spontaneous polarization and a liquid crystal layer functioning as another polarizer, thereby obtaining a high quality image. Furthermore, manufacturing cost may be saved by omitting one polarizer.

Additionally, in the case of a reflective LCD device according to the present invention, a compensation plate may be omitted, thereby reducing the manufacturing cost as well as a light and thin model.

It will be apparent to those skilled in the art that various modifications and variations may be made in a liquid crystal display device and a method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A transmissive liquid crystal display device, comprising:
a first substrate and a second substrate facing each other;
a pixel electrode on an inner surface of the first substrate, the pixel electrode formed of a transparent conductive material;
a first alignment layer of a ferroelectric liquid crystal material over the pixel electrode, the first alignment layer having a first liquid crystal director having a first spontaneous polarization along a first direction;
a common electrode on an inner surface of the second substrate;
a second alignment layer of the ferroelectric liquid crystal material over the common electrode, the second alignment layer having a second liquid crystal director having a second spontaneous polarization along the first direction;
a liquid crystal layer in between the first alignment layer and the second alignment layer, the liquid crystal layer including a nematic liquid crystal material and a dye material, wherein an absorption ratio of the dye material is changed by a polarization direction of the dye material; and a first polarizer disposed on an outer surface of either the first substrate or the second substrate without a polarizer on the other substrate, wherein the liquid crystal layer functions as a second polarizer rotating light by about 90 degrees, wherein the first spontaneous polarization is rotated along a same direction as the second spontaneous polarization, and wherein each of the first and second liquid crystal directors rotates when an electric field is applied such that one edge of each the first and second liquid crystal directors is fixed at a vertex of a cone shape and the other edge of each the first and second liquid crystal directors has a rotation formation along one direction in a spiral circumference of the cone shape.

2. The device according to claim 1, wherein the first and second spontaneous polarizations have a rotation angle within about 0 to about 90 degrees.

3. The device according to claim 1, further including a first auxiliary alignment layer between the first alignment layer and the pixel electrode, and a second auxiliary alignment layer between the second alignment layer and the common electrode.

4. The device according to claim 3, wherein the first and second auxiliary alignment layers include polyimide.

5. The device according to claim 1, wherein the dye material includes red, green, and blue dye materials in substantially equal amounts.

6. The device according to claim 1, wherein the liquid crystal layer includes a primary orientation parallel to a transmissive axis of the first polarizer.

7. The device according to claim 1, wherein the liquid crystal layer includes a primary orientation perpendicular to a transmissive axis of the first polarizer.

8. The device according to claim 1, wherein the first substrate further includes:
a gate line and a data line intersecting each other; and
a switching element connected to the gate line, the data line and the pixel electrode.

9. The device according to claim 1, wherein the second substrate further includes a color filter layer on the common electrode.

10. The device according to claim 1, wherein the liquid crystal display device is a transmissive device including a backlight unit disposed at a position opposite to the first polarizer.

11. The device according to claim 1, further including a reflective layer on the first substrate, wherein the liquid crystal layer functions as a compensation plate.

12. The device according to claim 11, wherein the reflective layer is disposed over the pixel electrode with an insulating layer therebetween.

13. The device according to claim 1, wherein the first polarizer is disposed on the exterior surface of the second substrate.

14. The device according to claim 1, wherein a thickness of the first and second alignment layers has a range within about 1000Å to about 3000Å.

15. The device according to claim 1, wherein the ferroelectric liquid crystal material has a smectic phase.

* * * * *